United States Patent
Gillett

(10) Patent No.: US 9,027,996 B2
(45) Date of Patent: May 12, 2015

(54) SAFETY SEAT

(75) Inventor: Sharon A. Gillett, Stowe, OH (US)

(73) Assignee: Wonderland Nurserygoods Company Limited, Central (HK)

( * ) Notice: Subject to any disclaimer, the term of this patent is extended or adjusted under 35 U.S.C. 154(b) by 297 days.

(21) Appl. No.: 13/476,175

(22) Filed: May 21, 2012

(65) Prior Publication Data

US 2013/0307304 A1 Nov. 21, 2013

(51) Int. Cl.
- *B60N 2/28* (2006.01)
- *A47C 1/11* (2006.01)
- *A47D 1/04* (2006.01)
- *A47D 1/00* (2006.01)

(52) U.S. Cl.
CPC ............... *B60N 2/2866* (2013.01); *A47C 1/11* (2013.01); *A47D 1/04* (2013.01); *A47D 1/004* (2013.01)

(58) Field of Classification Search
USPC .......... 297/256.11, 256.16, 440.22, 233–237, 297/239
See application file for complete search history.

(56) References Cited

U.S. PATENT DOCUMENTS

| | | | | |
|---|---|---|---|---|
| 3,606,461 A * | 9/1971 | Moriyama | ............... | 297/451.8 |
| 4,521,052 A * | 6/1985 | Cone | .................... | 297/3 |
| 4,603,903 A * | 8/1986 | Moscovitch | ............. | 297/256.11 |
| 4,854,638 A * | 8/1989 | Marcus et al. | ........... | 297/256.11 |
| 4,867,504 A * | 9/1989 | Johnson, Jr. | ...................... | 297/3 |
| 5,094,505 A * | 3/1992 | Nichols | ......................... | 297/118 |
| 5,183,314 A * | 2/1993 | Lorbiecki | ............... | 297/440.22 |
| 5,332,286 A * | 7/1994 | Atherton et al. | ......... | 297/256.11 |
| 5,335,968 A * | 8/1994 | Sheridan et al. | ........... | 297/250.1 |
| 6,079,772 A * | 6/2000 | Green | .......................... | 297/16.1 |
| 6,592,182 B1 * | 7/2003 | Noor | ............................ | 297/239 |
| 6,619,734 B2 * | 9/2003 | Helmsderfer | ................. | 297/130 |
| 7,011,368 B2 * | 3/2006 | Barth et al. | .................... | 297/239 |
| 7,387,337 B2 * | 6/2008 | Keegan et al. | ............ | 297/256.13 |
| 7,673,940 B2 * | 3/2010 | Fritz et al. | ................. | 297/256.11 |
| 8,226,161 B2 * | 7/2012 | Fiore et al. | .................... | 297/153 |
| 8,267,473 B2 * | 9/2012 | Flannery et al. | ......... | 297/256.16 |
| 2007/0096519 A1 * | 5/2007 | Conforti | ..................... | 297/218.2 |
| 2010/0066139 A1 * | 3/2010 | Woodring | ..................... | 297/239 |
| 2012/0038198 A1 * | 2/2012 | Feltrin | ..................... | 297/440.22 |
| 2013/0200671 A1 * | 8/2013 | Herzberg | .................. | 297/250.1 |

* cited by examiner

*Primary Examiner* — David R Dunn
*Assistant Examiner* — Timothy J Brindley
(74) *Attorney, Agent, or Firm* — Ladas & Parry LLP

(57) ABSTRACT

A safety seat includes a seat and a height adjusting component that is separably disposed under the seat, and that includes opposite first and second portions, heights of which are different. The safety seat is usable in one of a first height mode and a second height mode. In the first height mode, the first portion is disposed over the second portion, and in the second height mode, the first portion is disposed under the second portion.

10 Claims, 3 Drawing Sheets

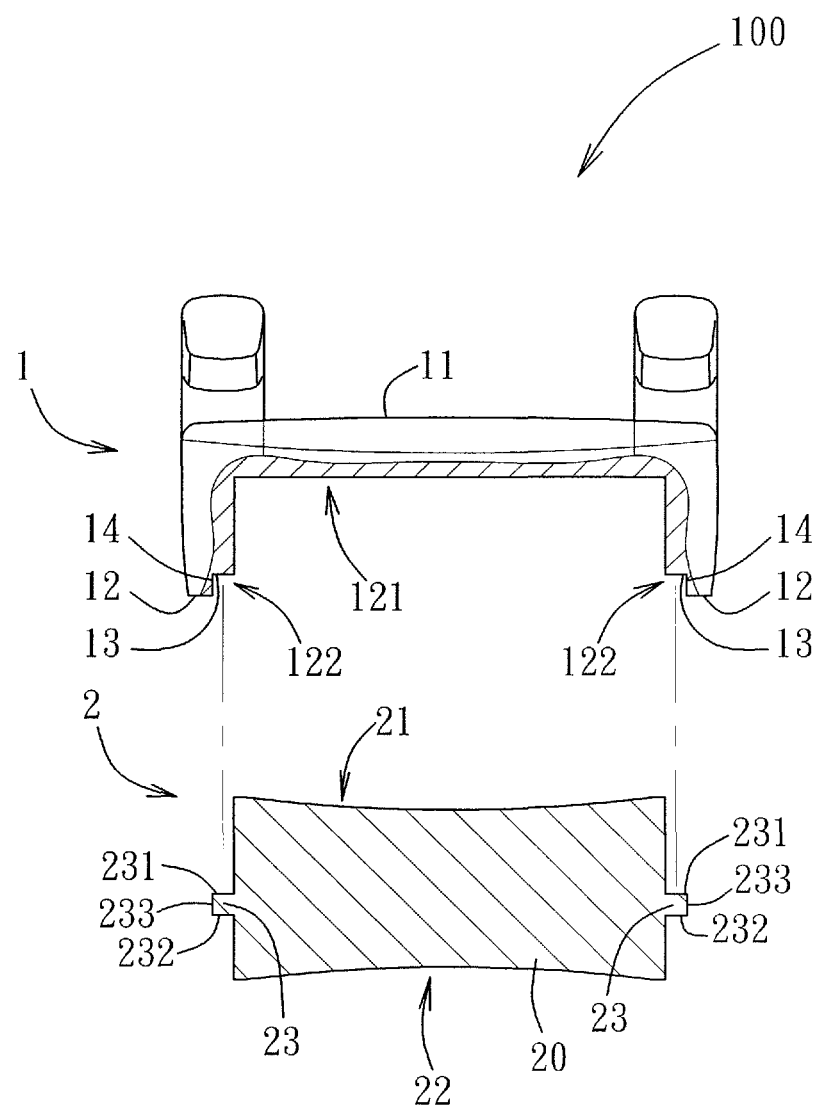
F I G. 2

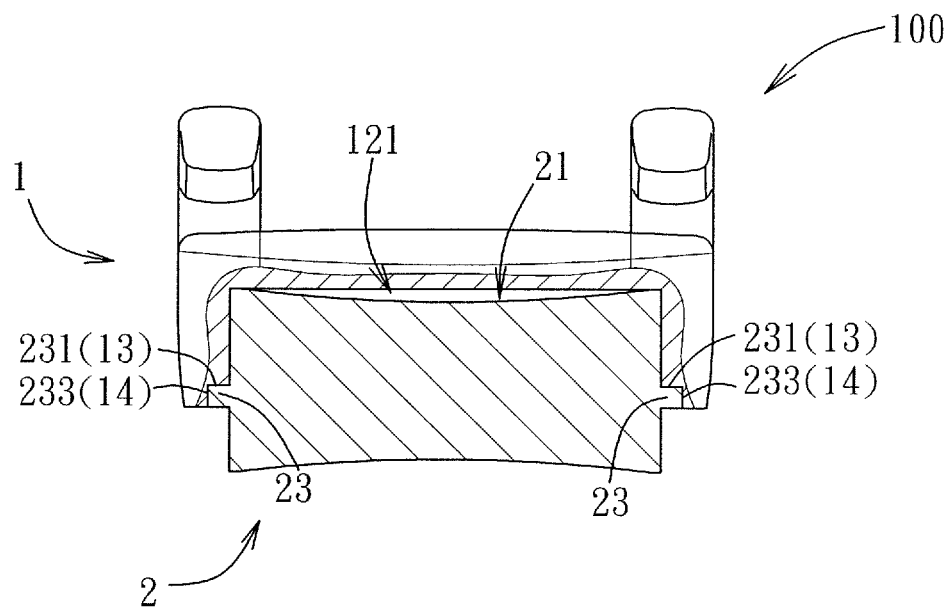
F I G. 3
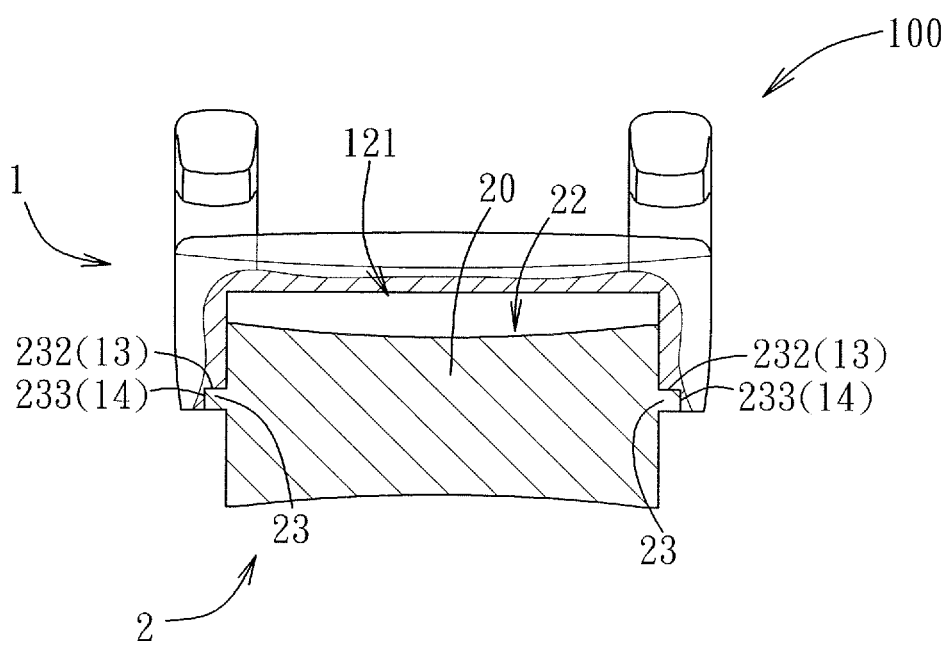
F I G. 4

SAFETY SEAT

BACKGROUND OF THE INVENTION

1. Field of the Invention

The invention relates to a safety seat, and more particularly to a safety seat whose height is adjustable.

2. Description of the Related Art

A typical child safety seat can be installed on a seat of a vehicle or an airplane for a child to sit thereon. To suit different body forms of children, some child safety seats are designed to be height-adjustable. However, conventional height-adjustable child safety seats are relatively expensive.

SUMMARY OF THE INVENTION

Therefore, an object of the present invention is to provide a safety seat whose height is adjustable and production cost may be relatively low.

According to the present invention, a safety seat comprises a seat and a height adjusting component separably disposed under the seat, and including opposite first and second portions, heights of which are different; the safety seat being usable in one of a first height mode and a second height mode. In the first height mode, the first portion is disposed over the second portion, and in the second height mode, the first portion is disposed under the second portion.

BRIEF DESCRIPTION OF THE DRAWINGS

Other features and advantages of the present invention will become apparent in the following detailed description of the preferred embodiment with reference to the accompanying drawings, of which:

FIG. 2 is an exploded sectional view of the preferred embodiment;

FIG. 3 is a sectional view showing the preferred embodiment being used in a first height mode; and FIG. 4 is a sectional view showing the preferred embodiment being used in a second height mode.

DETAILED DESCRIPTION OF THE PREFERRED EMBODIMENT

Figure 1:
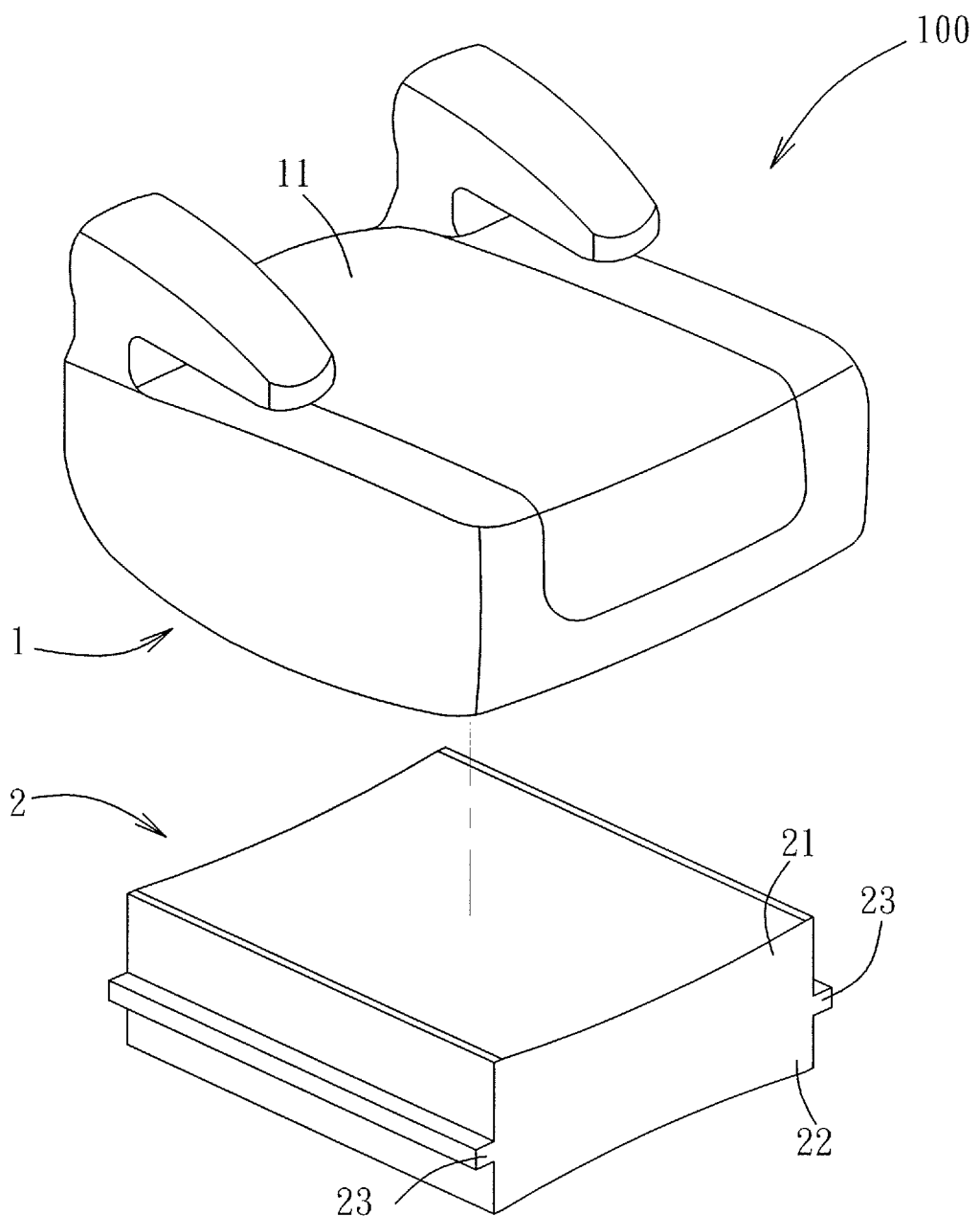
FIG. 1 is an exploded perspective view of a preferred embodiment of the safety seat according to the present invention.

Referring to FIG. 1 and FIG. 2, the preferred embodiment of the safety seat 100 according to this invention is shown to include a seat 1 and a height adjusting component 2.

The seat 1 includes a top surface 11 for a child to sit thereon, and a bottom surface 12 defining a first groove 121 and two second grooves 122 therein. The seat 1 has two horizontal first inner abutting surfaces 13, and two vertical second inner abutting surfaces 14 each connected between a respective one of the first inner abutting surfaces 13 and the bottom surface 12. The first inner abutting surfaces 13 cooperate with the second inner abutting surfaces 14 to define the second grooves 122. The first inner abutting surfaces 13 define respectively top ends of the second grooves 122, and the second grooves 122 are in spatial communication with and below the first groove 121.

The height adjusting component 2 is separably disposed under the seat 1, and includes opposite first and second portions 21 and 22. Heights of the first and second portions 21 and 22 are different. That is, the height adjusting component 2 is divided into the height-asymmetric first and second portions 21 and 22 by deviating from a center thereof along a vertical direction. In this embodiment, the height of the first portion 21 is greater than that of the second portion 22. The height adjusting component 2 is generally a cuboid. The height adjusting component 2 has a body 20 and two ribs 23 that laterally extend from the body 20 and that divide the body 20 into the first and second portions 21 and 22 located respectively at two opposite sides of the ribs 23. Each of the ribs 23 has a horizontal first outer abutting surface 231, a horizontal second outer abutting surface 232 opposite to the first outer abutting surface 231, and a vertical side rib surface 233 interconnecting the first and second outer abutting surfaces 231, 232.

The safety seat 100 is usable in a first height mode and a second height mode. Referring to FIG. 3, in the first height mode, the first portion 21 is disposed over the second portion 22 and within the first groove 121, and the first outer abutting surfaces 231 of the ribs 23 abut respectively against the first inner abutting surfaces 13 of the seat 1.

Referring to FIG. 4, in the second height mode, the second portion 22 is disposed over the first portion 21 and within the first groove 121, and the second outer abutting surfaces 232 of the ribs 23 abut respectively against the first inner abutting surfaces 13 of the seat 1. Since height of the first portion 21 is greater than that of the second portion 22, the height of the safety seat 100 used in the second height mode is greater than that of the safety seat 100 used in the first height mode, so that the safety seat 100 is height-adjustable.

Referring to FIG. 3 and FIG. 4, in this embodiment, the height adjusting component 2 is disposed partially within the seat 1 in a close fitting manner. In the first height mode, lateral side surfaces of the first portion 21 are in intimate contact with vertical inner surfaces of the seat 1 that define the first groove 121, and the side rib surfaces 233 are in intimate contact with the second inner abutting surfaces 14, respectively. In the second height mode, lateral side surfaces of the second portion 22 are in intimate contact with the vertical inner surfaces of the seat 1 that define the first groove 121, and the side rib surfaces 233 are in intimate contact with the second inner abutting surfaces 14, respectively. In other alternative embodiments, only the side rib surfaces 233 are in intimate contact with the second inner abutting surfaces 14, respectively, while a gap is formed between the side surfaces of the first portion 21 and the vertical inner surfaces of the seat 1, or between the side surfaces of the second portion 22 and the vertical inner surfaces of the seat 1.

To sum up, since the heights of the first and second portions 21 and 22 of the height adjusting component 2 are designed to be different, the safety seat 100 can be used in the first and second height modes, thereby resulting in a height-adjustable structure. When a child with a smaller body form uses the safety seat 100, the safety seat 100 may be used in the second height mode. On the other hand, when a child with a larger body form uses the safety seat 100, the safety seat 100 may be used in the first height mode.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A safety seat comprising:

a seat including only one top surface for a child to sit thereon; and a height adjusting component separably disposed under said seat, and including opposite first and second portions, heights of which are different;

said safety seat being usable in one of a first height mode and a second height mode, wherein, in the first height mode, said first portion is disposed over said second portion, and in the second height mode, said first portion is disposed under said second portion; and wherein said only one top surface faces upwardly in both of the first height mode and the second height mode, wherein said seat has at least one first inner abutting surface, and said height adjusting component has a body and at least one rib that laterally extends from said body and that divides said body into said first and second portions located respectively at two opposite sides of said rib, said rib having a first outer abutting surface and a second outer abutting surface, such that in the first height mode, said first outer abutting surface of said rib abuts against said first inner abutting surface of said seat, and in the second height mode, said second outer abutting surface of said rib abuts against said first inner abutting surface of said seat.

2. The safety seat as claimed in claim 1, wherein said body is a cuboid, said height adjusting component has two of said ribs laterally extending away from each other, and said seat has two of said first inner abutting surfaces, such that in the first height mode, said first outer abutting surfaces of said ribs abut respectively against said first inner abutting surfaces of said seat, and in the second height mode, said second outer abutting surfaces of said ribs abut respectively against said first inner abutting surfaces of said seat.

3. The safety seat as claimed in claim 2, wherein said seat further has a bottom surface that defines a first groove therein, such that in the first height mode, said first portion of said height adjusting component is disposed in said first groove, and in the second height mode, said second portion of said height adjusting component is disposed in said first groove.

4. The safety seat as claimed in claim 3, wherein said bottom surface of said seat further defines two second grooves therein for engaging said ribs, respectively, said first inner abutting surfaces defining respectively top ends of said second grooves.

5. The safety seat as claimed in claim 4, wherein said second grooves are in spatial communication with and below said first groove, said height adjusting component being disposed partially within said seat in a close fitting manner.

6. The safety seat as claimed in claim 5, wherein each of said ribs further has a side rib surface interconnecting said first and second outer abutting surfaces, and said seat further has two vertical second inner abutting surfaces each connected between a respective one of said first inner abutting surfaces and said bottom surface, said first inner abutting surfaces cooperating with said two vertical second inner abutting surfaces to define said second grooves, said side rib surfaces being in intimate contact with said two vertical second inner abutting surfaces respectively, so that said height adjusting component is disposed partially within said seat in the close fitting manner.

7. The safety seat as claimed in claim 1, wherein said seat further has a bottom surface that defines a first groove therein, such that in the first height mode, said first portion of said height adjusting component is disposed in said first groove, and in the second height mode, said second portion of said height adjusting component is disposed in said first groove.

8. The safety seat as claimed in claim 7, wherein said bottom surface of said seat further defines a second groove therein for engaging said rib, said first inner abutting surface defining a top end of said second groove.

9. The safety seat as claimed in claim 8, wherein said second groove is in spatial communication with and below said first groove, said height adjusting component being disposed partially within said seat in a close fitting manner.

10. The safety seat as claimed in claim 9, wherein said rib further has a side rib surface interconnecting said first and second outer abutting surfaces, and said seat further has a vertical second inner abutting surface connected between said first inner abutting surface and said bottom surface, said first inner abutting surface cooperating with said vertical second inner abutting surface to define said second groove, said side rib surface being in intimate contact with said vertical second inner abutting surface, so that said height adjusting component is disposed partially within said seat in the close fitting manner.

\* \* \* \* \*